US012500990B2

(12) United States Patent
Kim

(10) Patent No.: US 12,500,990 B2
(45) Date of Patent: Dec. 16, 2025

(54) ROBOT SENSING ANIMAL WASTE LOCATED INDOORS AND CONTROLLING METHOD THEREOF

(71) Applicant: SAMSUNG ELECTRONICS CO., LTD., Suwon-si (KR)

(72) Inventor: Duckhwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 18/134,873

(22) Filed: Apr. 14, 2023

(65) Prior Publication Data

US 2023/0249352 A1 Aug. 10, 2023

Related U.S. Application Data

(63) Continuation of application No. PCT/KR2021/013559, filed on Oct. 5, 2021.

(30) Foreign Application Priority Data

Nov. 27, 2020 (KR) .................. 10-2020-0162020

(51) Int. Cl.
*G05D 1/648* (2024.01)
*B60R 1/00* (2022.01)
(Continued)

(52) U.S. Cl.
CPC ............ *H04N 5/2624* (2013.01); *B60R 1/00* (2013.01); *B60R 1/27* (2022.01); *G01S 15/931* (2013.01); *G05D 1/243* (2024.01); *G05D 1/6486* (2024.01); *G06V 20/56* (2022.01); *H04N 7/181* (2013.01); *H04N 23/90* (2023.01);
(Continued)

(58) Field of Classification Search
None
See application file for complete search history.

(56) References Cited

U.S. PATENT DOCUMENTS 9,131,664 B2 9/2015 Tanigawa et al.
10,368,708 B2 8/2019 Cornelissen
(Continued)

FOREIGN PATENT DOCUMENTS

EP 3 345 525 B1 7/2018
JP 6190750 B2 8/2017
(Continued)

OTHER PUBLICATIONS

International Search Report (PCT/ISA/210) issued by the International Searching Authority on Jan. 3, 2022 for International Patent Application No. PCT/KR2021/013559.
(Continued)

*Primary Examiner* — Ryan Rink
(74) *Attorney, Agent, or Firm* — Sughrue Mion, PLLC

(57) ABSTRACT

A robot includes a gas collector; a gas sensor configured to sense a gas collected by the gas collector; a camera; a driver; and a processor configured to: based on the gas sensed by the gas sensor identified as a first type gas, control the driver to decrease a moving speed of the robot, identify a gas generating area based on data sensed by the gas sensor while the robot is moving at the decreased speed, and control the camera to capture the identified gas generating area.

13 Claims, 12 Drawing Sheets

(51) Int. Cl.
   *B60R 1/27*      (2022.01)
   *G01S 15/931*    (2020.01)
   *G05D 1/243*     (2024.01)
   *G06V 20/56*     (2022.01)
   *H04N 5/262*     (2006.01)
   *H04N 7/18*      (2006.01)
   *H04N 23/90*     (2023.01)
   *B25J 9/00*      (2006.01)

(52) U.S. Cl.
   CPC .......... *A47L 2201/04* (2013.01); *B25J 9/0003* (2013.01); *B60R 2300/105* (2013.01); *B60R 2300/20* (2013.01); *B60R 2300/301* (2013.01); *B60R 2300/607* (2013.01); *B60R 2300/802* (2013.01)

(56) References Cited

U.S. PATENT DOCUMENTS

| | | | |
|---|---|---|---|
| 10,383,497 B2 | 8/2019 | Han et al. | |
| 11,503,971 B2 | 11/2022 | Kim et al. | |
| 2014/0311415 A1 | 10/2014 | Tanigawa et al. | |
| 2015/0373905 A1* | 12/2015 | Anderson | A01C 21/00 701/33.9 |
| 2016/0259341 A1* | 9/2016 | High | H04W 4/80 |
| 2016/0278599 A1* | 9/2016 | Seo | H04Q 9/00 |
| 2016/0334800 A1 | 11/2016 | Han et al. | |
| 2017/0231446 A1* | 8/2017 | Watanabe | G08B 19/005 15/319 |
| 2017/0273528 A1* | 9/2017 | Watanabe | A47L 9/0477 |
| 2018/0125318 A1* | 5/2018 | Cornelissen | G05D 1/617 |
| 2020/0019168 A1* | 1/2020 | Guzman | G05D 1/0094 |
| 2020/0047343 A1* | 2/2020 | Bal | B25J 9/1689 |
| 2021/0208049 A1* | 7/2021 | Mou | G01N 1/24 |
| 2021/0278861 A1* | 9/2021 | Ben-David | G05D 1/0255 |
| 2021/0321847 A1* | 10/2021 | Kim | A47L 11/4025 |
| 2021/0338028 A1 | 11/2021 | Park et al. | |
| 2021/0389772 A1 | 12/2021 | Kim et al. | |
| 2022/0024050 A1 | 1/2022 | Lim et al. | |
| 2022/0126457 A1* | 4/2022 | Wu | B25J 9/1674 |
| 2022/0218169 A1* | 7/2022 | Minahashi | G06V 20/56 |
| 2023/0051111 A1* | 2/2023 | Cyrus | B60L 15/20 |
| 2025/0035502 A1* | 1/2025 | Walaie | G05D 1/689 |

FOREIGN PATENT DOCUMENTS

| | | |
|---|---|---|
| JP | 2018-515191 A | 6/2018 |
| JP | 2022-510558 A | 1/2022 |
| KR | 10-2016-0133348 A | 11/2016 |
| KR | 10-2019-0092338 A | 8/2019 |
| KR | 10-2020-0011623 A | 2/2020 |
| KR | 10-2020-0056493 A | 5/2020 |
| KR | 10-2021-0155409 A | 12/2021 |
| KR | 10-2022-0013073 A | 2/2022 |
| KR | 10-2022-0019930 A | 2/2022 |
| KR | 10-2467990 | * 11/2022 |

OTHER PUBLICATIONS

Written Opinion (PCT/ISA/237) issued by the International Searching Authority on Jan. 3, 2022 for International Patent Application No. PCT/KR2021/013559.

Communication issued Sep. 19, 2025 by the Korean Intellectual Property Office for Korean Patent Application No. 10-2020-0162020.

* cited by examiner

ROBOT SENSING ANIMAL WASTE LOCATED INDOORS AND CONTROLLING METHOD THEREOF

CROSS-REFERENCE TO RELATED APPLICATIONS

This application is a bypass continuation application of International Application No. PCT/KR2021/013559, filed on Oct. 5, 2021, which claims priority to Korean Patent Application No. 10-2020-0162020, filed on Nov. 27, 2020, in the Korean Intellectual Property Office, the disclosures of which are incorporated by reference herein in their entireties.

BACKGROUND

1. Field

The disclosure relates to a robot that detects a contaminant source and performs an operation corresponding to the contaminant source and a method for controlling the same.

2. Description of the Related Art

Currently, robots used in homes are being commercialized. Specifically, technological developments on cleaning robots that clean indoor spaces are actively being carried out. Cleaning robots of the related art may have a problem of dirtying an indoor space by driving over without identifying a contaminant source such as animal waste or food products spilt by a small child. To address this problem, a method of identifying a contaminant source by utilizing a thermal imaging camera has been proposed, but this creates a computational burden on a processor and causes sensing errors that are incapable of corresponding to diversity in forms of contaminant sources and therefore, these problems are currently unsolved.

Accordingly, there is a continuous demand for a technology that accurately identifies the contaminant source without placing the computational burden on the processor and performs an operation corresponding to an identified contaminant source.

SUMMARY

Provided are a robot that identifies a contaminant source by sensing gas and performs an operation corresponding to the contaminant source and a method for controlling the same.

According to an aspect of the disclosure, a robot includes a gas collector; a gas sensor configured to sense a gas collected by the gas collector; a camera; a driver; and a processor configured to: based on the gas sensed by the gas sensor identified as a first type gas, control the driver to decrease a moving speed of the robot, and identify a gas generating area based on data sensed by the gas sensor while the robot is moving at the decreased speed, and control the camera to capture the identified gas generating area.

The gas sensor may include a first sensor configured to sense the first type gas and a second sensor configured to sense a second type gas different from the first type gas, the processor may be further configured to: based on the first type gas, control the driver to decrease the moving speed of the robot, and identify the gas generating area based on data sensed by the second sensor while the robot is moving at the decreased speed.

The first type gas may be faster in propagation velocity than the second type gas.

The robot may further include a memory configured to store map data of a space in which the robot drives, wherein the processor is configured to: based on the second type gas being detected from a first location on the map data while the robot is moving at the decreased speed, control the driver to move the robot to a second location on the map data, and identify the gas generating area based on first sensing data obtained by the second sensor from the first location and second sensing data obtained by the second sensor from the second location.

The processor may be further configured to: identify an area at which a concentration of the second type gas based on the first sensing data and the second sensing data is greater than or equal to a threshold value, and identify the identified area as the gas generating area.

The processor may be further configured to: based on the concentration of the second type gas obtained based on the first sensing data and the second sensing data being less than the threshold value, control the driver to move the robot to a third location on the map data, and identify the gas generating area based on the first sensing data, the second sensing data, and third sensing data obtained by the second sensor from the third location.

The camera may include a depth camera and an RGB camera, and the processor may be further configured to: based on the gas generating area being identified, obtain a probability distribution of a presence of a contaminant source corresponding to the identified gas generating area based on images obtained by the depth camera and the RGB camera, respectively, and identify that the contaminant source is present at a location at which a probability on the presence of the contaminant source is greater than or equal to the threshold value from among the gas generating area based on the obtained probability distribution.

The robot may further include a communication interface and the processor may be configured to: based on the contaminant source being identified and an area at which a pre-set object is located on the map data being comprised within the identified gas generating area, provide feedback associated with the preset object, and based on the contaminant source being identified and the area at which the pre-set object is located on the map data not being comprised within the identified gas generating area, provide information associated with the gas generating area to an external device through the communication interface, wherein the information comprises information on the contaminant source.

The processor may be further configured to re-identify the gas generating area based on it being identified that the contaminant source is not present in the gas generating area based on the obtained probability distribution.

The processor may be further configured to control the driver to cause the robot avoid the identified contaminant source.

The gas collector may have a funnel shape toward a front surface part of the gas sensor, the front surface part of the gas collector may have an open circular shape or an open elliptical shape, and a back surface part of the gas collector may have an open circular shape or an open elliptical shape that is smaller than the front surface part of the gas collector.

According to an aspect of the disclosure, a method for controlling of a robot including a gas sensor, includes: sensing a gas collected by a gas collector; based on the sensed gas being identified as a first type gas, decreasing a moving speed of the robot; identifying a gas generating area based on data sensed by the gas sensor while the robot is moving at a decreased speed; and capturing the identified gas generating area using a camera of the robot.

The gas sensor may include a first sensor that may be configured to sense the first type gas and a second sensor that may be configured to sense a second type gas different from the first type, the decreasing the moving speed of the robot includes, based on the first type gas being sensed by the first sensor, decreasing the moving speed of the robot, and the identifying the gas generating area includes identifying the gas generating area based on data sensed by the second sensor while the robot is moving at the decreased speed.

The first type gas is faster in propagation velocity than the second type gas.

The method may further include: based on the second type gas being detected from a first location on a map data of a space in which the robot drives while the robot is moving at the decreased speed, moving the robot to a second location on the map data, wherein the identifying the gas generating area includes identifying the gas generating area based on first sensing data obtained by the second sensor from the first location and second sensing data obtained by the second sensor from the second location.

Additional embodiments will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
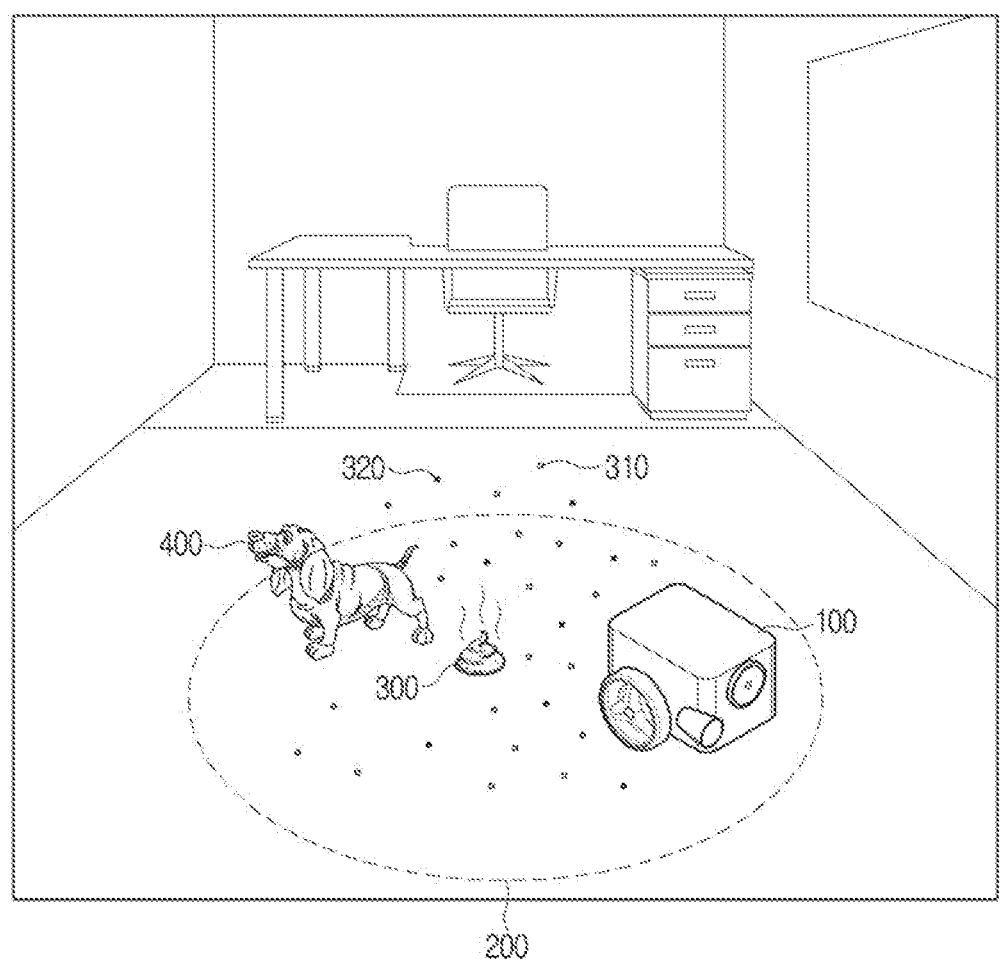
FIG. 1 is a diagram illustrating an operation of a robot identifying an contaminant source that is located in an indoor space.

Embodiments of the disclosure will be described in detail below with reference to the accompanying drawings.

Terms used in describing various example embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression "at least one of A or B" indicates only "A," only "B," or both "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in the embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

In the disclosure, the term "user" may refer to a person using a robot. In addition, an operation of a robot will be described assuming that a specific space in which the robot operates is an indoor space.

An embodiment of the disclosure will be described in greater detail below with reference to the accompanied drawings.

FIG. 1 is a diagram illustrating an operation of a robot identifying a contaminant source that is located in an indoor space.

Referring to FIG. 1, according to an embodiment of the disclosure, a robot 100 may be implemented as a cleaning robot that cleans the indoor space. According an example, the robot 100 may include a suctioning part at a lower part, and perform cleaning of dust and the like that is distributed in the indoor space through the suctioning part.

According to an example, in the indoor space at which the robot 100 is located, waste 300 generated by an animal 400 may be located. Gas of different types may be generated from a contaminant source 300, and one gas type may be described as a first type gas 310, and another gas type may be described as a second type gas 320.

According to an example, the robot 100 may remove waste 300 on its own or provide a notification of the waste 300 to a user to cleanly maintain the indoor space. The robot 100 may perform an operation (hereinafter, reward) of complimenting the animal 400 if the waste 300 is located on a specific object such as an absorbent pad.

If the robot 100 identifies the contaminant source 300 by utilizing a thermal imaging camera or an image sensor, a computational burden to a processor may be reduced, but because the thermal imaging camera is high-priced, there has been difficulty for robots of the related art to effectively identify the contaminant source 300. Accordingly, a method of identifying a contaminant source by sensing gas generated from the contaminant source 300 has been provided, but there has been the problem of sensing being difficult when the gas concentration generated from the contaminant source 300 is thin, or accurate sensing being difficult due to turbulence generated by the suctioning part of the robot 100 or by a driver when driving.

In the disclosure, a robot that identifies the contaminant source and performs an operation corresponding thereto and a controlling method thereof will be described to solve the above-described problems.

According to an embodiment of the disclosure, the robot 100 may identify a certain area 200 that includes the waste 300 by sensing different gas types 310 and 320 respectively from the waste 300. In the disclosure, the corresponding area 200 may be described as a 'gas generating area.' the robot 100 may identify waste 300 within the identified area.

Accordingly, various embodiments in which the robot identifies the contaminant source and performs an operation corresponding thereto will be described in greater detail below.

Figure 2:
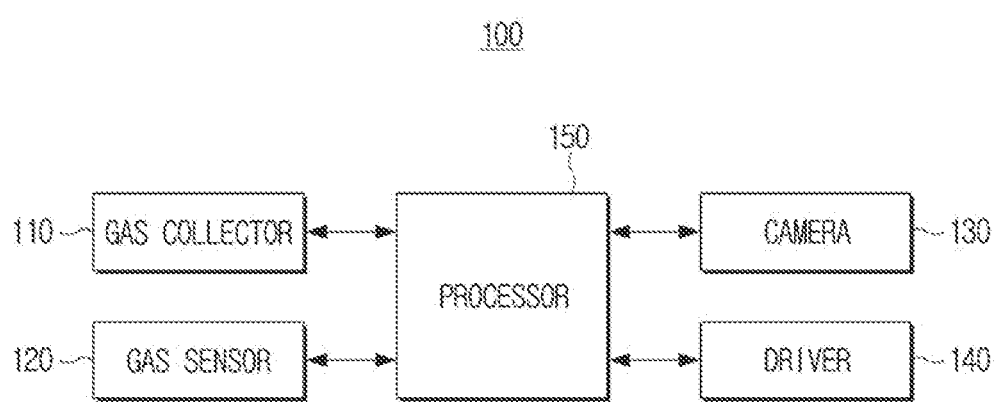
FIG. 2 is a block diagram illustrating a configuration of a robot according to an embodiment of the disclosure.

FIG. 2 is a block diagram illustrating a configuration of the robot according to an embodiment of the disclosure.

Referring to FIG. 2, according to an embodiment of the disclosure, the robot 100 may include a gas collector 110, a gas sensor 120, a camera 130, a driver 140, and a processor 150.

The gas collector 110 may be a member that collects gas molecules distributed in the air. The gas collector 110 may be realized with a metal or a synthetic resin, but is not limited thereto. The gas collector 110 may be realized in a funnel form facing towards a front surface part of the gas sensor 120 to collect gas along a driving of the robot 100 according to an embodiment of the disclosure.

The front surface part of the gas collecting funnel configuring the gas collector 110 may have a cross-section in a circular form or an elliptical form, and a back surface part may be in a shape with a cross-section in the circular or elliptical form that is a size lesser than the cross-section of the front surface part. A flow of air from the front surface part to the back surface part may be formed as the front surface part and the back surface part of the gas collecting funnel have open-type structures.

Additionally, the gas sensor 120 may be located between the front surface part and the back surface part of the gas collecting funnel, and the gas sensor 120 may sense gas collected by hydrodynamic properties of the gas collecting funnel.

According to an embodiment of the disclosure, if the gas collector 110 is located at the lower part of the robot 100, gas may not be sufficiently collected due to the suctioning part included in the robot 100 and due to turbulence generated by the driver 140. Accordingly, the gas collector 110 may be provided at a location that satisfies a certain standard. If the gas collector 110 is located at a lowest part of the robot 100, there is a problem in collecting gas smoothly due to an effect of turbulence generated by the driver 140. Accordingly, the gas collector 110 may be provided at a location that is greater than or equal to 100 mm in height from a ground surface, and installed at a point with a lowest end being 100 mm in height from the position that is greater than or equal to 100 mm in height and is free from the effect of turbulence.

The gas collector 110 may be located at a front end of the robot 100 to collect gas quickly along the driving of the robot 100.

The gas sensor 120 may sense gas molecules distributed in a space in which the robot 100 drives. The gas sensor 120 may be located on the gas collector 110 to sense gas collected by the gas collector 110. The gas sensor 120 may sense gas molecules and convert the sensed information to an electric signal, and the processor 150 may obtain information on a gas concentration that is distributed in the space based on the electric signal received from the gas sensor 120.

The gas sensor 120 may sense various types of gases. Specifically, the gas sensor 120 may sense hydrogen sulfide ($H_2S$) and ammonia ($NH_3$) molecules which are main gas molecules that are generated from the contaminant source 300. The gas sensor 120 may be implemented in a module form that includes a plurality of sensors configured to sense a single type of gas.

The camera 130 may be a device that captures an area within a Field of View (FoV) of the camera. The camera 130 may include an object, a lens which focuses visible rays and an infrared signal that is reflected by and received from, for example, the contaminant source 300 to the image sensor, and the image sensor which can detect visible rays and the infrared signal. Here, the image sensor may include a 2-dimensional (2D) pixel array that is divided into a plurality of pixels.

According to an embodiment of the disclosure, the camera 130 may be implemented in a module form that includes a depth camera and an RGB camera, and the depth camera may be a camera which uses an infrared (IR) projector and a plurality of infrared sensors.

The driver 140 may be a device which can drive the robot 100, and a processor 150 may control the driver 140 to adjust a driving direction and a driving speed. To this end, the driver 140 may include a power generating device (e.g., a gasoline engine, a diesel engine, a liquefied petroleum gas (LPG) engine, an electric motor, etc. In accordance with a fuel used (or energy source) that generates power for the robot 100 to drive, a steering device (e.g., a manual steering, a hydraulics steering, an electronic control power steering (EPS), etc.) may be used for adjusting the driving direction, a driving device (e.g., wheel, propeller, etc.) may be used for driving the robot 100. Further, the driver 140 may be modified and implemented according to a driving type of the robot 100 (e.g., a wheel type, a walking type, a flying type, etc.).

The processor 150 may control the overall operation of the robot 100. Specifically, the processor 150 may control the overall operation of the robot 100 by being coupled with respective configurations of the robot 100. For example, the processor 150 may control an operation of the robot 100 by being connected with a memory 160 and the camera 130.

According to an embodiment, the processor 150 may be designated to various designations such as, for example, and without limitation, a digital signal processor (DSP), a micro-processor, a central processing unit (CPU), a micro controller unit (MCU), a micro processing unit (MPU), a neural processing unit (NPU), a controller, an application processor (AP), and the like, but is described as the processor 150 in the disclosure.

The processor may be implemented as a System of Chip (SoC) or a large scale integration (LSI), and may be implemented in a form of a field programmable gate array (FPGA). In addition, the processor 150 may include a volatile memory such as a static random access memory (SRAM).

According to an embodiment, the processor 150 may control the driver 140 to decrease a moving speed of the robot 100 when the gas sensed by the gas sensor 120 is identified as the first type gas 310. Further, the first type gas 310 may be gas of a specific type that is generated from the contaminant source 300, and may be gas that is diffused homogeneously in an indoor space.

While the robot 100 is moving at a decreased speed, the processor 150 may identify a gas generating area based on data sensed by the gas sensor 120. Further, the gas generating area may be an area in which gas generated from the contaminant source 300 is intensively distributed, and specifically, the gas generating area may be an area in which a gas concentration of a pre-set type is identified as greater than or equal to a threshold concentration. Assuming that gas is homogeneously diffused from the contaminant source 300 that is located in the indoor space, a gas generating area 200 may be an area that includes the contaminant source 300 at a center of the area.

The processor 150 may control the camera 130 to capture the identified gas generating area 200. As the robot 100 detects the contaminant source 300 through the camera 130, only when the gas generating area 200 may be identified, the computational burden applied to the processor 150 and power consumption may be reduced.

According to an embodiment of the disclosure, the processor 150 may control the driver 140 to decrease the moving speed of the robot 100 when the first type gas 310 is sensed by a first sensor. While the robot 100 is moving at a decreased speed, the gas generating area 200 may be identified based on data sensed by a second sensor that senses the second type gas 320. The first type gas 310 may be gas with a propagation velocity that is faster than the second type gas 320. Molecules of the first type gas 310 may be molecules with a lesser molecular weight than molecules of the second type gas 320, for example, the first type gas 310 may be hydrogen sulfide ($H_2S$) and the second type gas 320 may be ammonia ($NH_3$).

According to an embodiment of the disclosure, the robot 100 may further include a memory stored with map data of a space in which the robot 100 drives. The processor 150 may control the driver 140 for the robot 100 to move to a second location on a map data when the second type gas 320 is detected from a first location on the map data while the robot 100 is moving at a decreased speed. Specifically, because the robot 100 cannot estimate a gas concentration distribution within the space with only the concentration of the second type gas 320 sensed by the gas sensor 120 from the first location, the robot 100 may move to the second location which is different from the first location according to the control of the processor 150.

The processor 150 may identify the gas generating area 200 based on first sensing data obtained by the second sensor from the first location and second sensing data obtained by the second sensor from the second location. The above will be described in detail in FIG. 5.

According to an embodiment of the disclosure, the processor 150 may identify an area at which the concentration of the second type gas 320 based on the first sensing data and the second sensing data is greater than or equal to a threshold value as the gas generating area 200.

The processor 150 may control, based on the concentration of the second type gas 320 obtained based on the first sensing data and the second sensing data being less than the threshold value, the driver 140 for the robot 100 to move to a third location on the map data. The processor 150 may identify the gas generating area 200 based on the first sensing data, the second sensing data, and third sensing data obtained by the second sensor from the third location.

According to an embodiment of the disclosure, the processor 150 may obtain, based on the gas generating area 200 being identified, a probability distribution of the presence of the contaminant source 300 corresponding to the identified gas generating area 200 based on images obtained by the depth camera and the RGB camera, respectively, and identify that the contaminant source 300 is present at a location at which a probability on a presence of a contaminant source is greater than or equal to the threshold value from among the gas generating area 200 based on the obtained probability distribution.

According to an embodiment of the disclosure, the robot 100 may further include a communication interface, the processor 150 may provide feedback that includes a reward associated with an object if the contaminant source 300 is identified and the area at which a pre-set object is located on the map data is included within the identified gas generating area 200. The object may be an absorbent pad provided in a waste space of an animal.

The processor 150 may provide information associated with the contaminant source 300 to an external device through the communication interface when the contaminant source 300 is identified and an area at which the pre-set object is located on the map data is not included within the identified gas generating area 200. The information associated with the contaminant source may include a type of the contaminant source, a location of the contaminant source, a size of the contaminant source, a presumed time of occurrence of the contaminant source, and the like.

The external device may be a smartphone of a user. Accordingly, the robot 100 may not only perform an operation of identifying the contaminant source 300, but also perform an operation of providing location information of the contaminant source to the user of the external device so as to clean the contaminant source.

According to an embodiment of the disclosure, the processor 150 may re-identify the gas generating area 200 when it is identified that the contaminant source 300 is not present in the gas generating area 200 based on the obtained probability distribution. Specifically, it may be assumed that the contaminant source 300 is not present within an area at which the gas concentration is greater than or equal to the threshold value due to obstacles such as an outer wall, furniture, and the like being present in an indoor space and an effect of home appliances and the like that generate convection such as a fan or an air conditioner. In this case, the processor 150 may re-identify the gas generating area 200 based on sensing data obtained by the gas sensor 120 and map data of the space.

According to an embodiment of the disclosure, the processor 150 may determine, based on the contaminant source 300 being identified, an avoidance driving for the robot 100 to not drive through the contaminant source 300. Specifically, the processor 150 may update the location of the contaminant source 300 on the map data, and control the driver 140 for the robot 100 to avoid the updated location.

Figure 3:
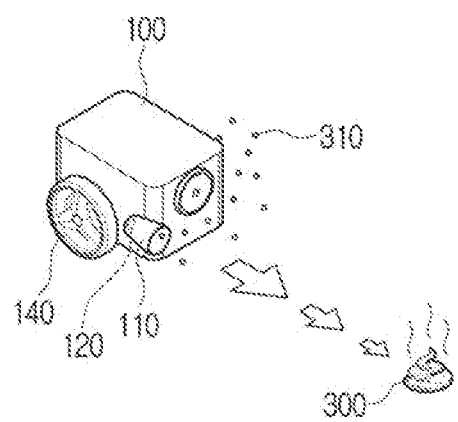
FIG. 3 is a diagram illustrating a deceleration driving of a robot according to an embodiment of the disclosure.

FIG. 3 is a diagram illustrating a deceleration driving of the robot according to an embodiment of the disclosure.

According to an embodiment, the robot 100 may sense the first type gas 310 while driving in an indoor space. Here, the first type gas 310 may be gas with a molecular weight that is smaller than an average molecular weight of molecules forming the atmosphere, and the first type gas 310 may be hydrogen sulfide.

While driving, two types of turbulence may be generated by the robot 100. Among the types, one may be a first turbulence that is generated as the robot 100 moves forcing aside air within the space, and another may be a second turbulence that is generated by a motion of the driver 140.

The turbulence described above may be a cause for making sensing by the gas sensor 120 difficult by dispersing the gas molecules distributed at a surrounding of the robot. The first turbulence may increase as the speed of the robot 100 is increased, and because the motion of the driver 140 also increases as the speed of the robot 100 is increased, the robot 100 may minimize the effects of the first turbulence and the second turbulence through deceleration.

The first type gas may be described below assuming that it is a gas with a fastest propagation velocity because the molecular weight is the smallest from among the gas generated from the contaminant source 300. Because the first type gas 310 is gas that is diffused the farthest from the contaminant source 300, the robot 100 may sense the first type gas 310 from an outermost region to which the gas is distributed. The robot 100 may begin the above-described deceleration based on sensing the first type gas 310. The gases of different types that are located close to the contaminant source 300 than the first type gas 310 may be less affected by the turbulence generated by the movement of the robot 100 or the motion of the driver 140.

Further, the robot 100 may effectively collect gas despite the effect of the first turbulence by having the gas collector 110 with a structure open towards a front direction.

Figure 4:
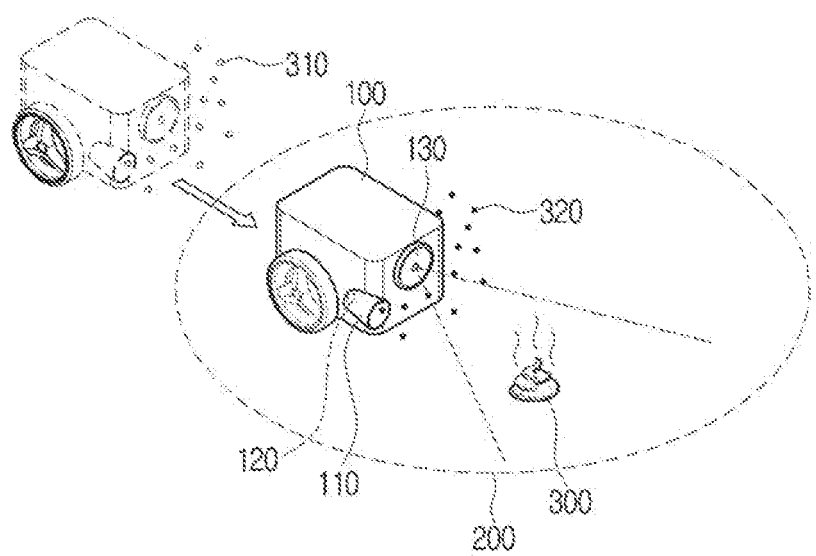
FIG. 4 is a diagram illustrating a capturing operation of a gas generating area by a robot according to an embodiment of the disclosure.

FIG. 4 is a diagram illustrating a capturing operation of a gas generating area by the robot according to an embodiment of the disclosure.

The robot 100 may sense the second type gas 320 while the robot 100 is performing deceleration driving after sensing the first type gas 310. Here, the second type gas 320 may be gas with a molecular weight that is greater than the average molecular weight of molecules that form the atmosphere, and the second type gas 320 may be ammonia.

The robot 100 may sense the second type gas 320 collected by the gas collector 110 through the gas sensor 120, and identify the certain area 200 formed at the surrounding of the contaminant source 300 based on the sensing data. The sensing data may be a concentration (unit: ppm) of the sensed second type gas 320. The gas sensor 120 may include the first sensor that senses the first type gas 310 and the second sensor that senses the second type gas 320.

Here, the certain area 200 formed at the surrounding of the contaminant source 300 may be described as the 'gas generating area 200.' According to an embodiment of the disclosure, the robot 100 may identify the location of the contaminant source 300 only when the gas generating area 200 is identified. Accordingly, the robot 100 may save on power that is consumed in identifying the contaminant source 300, and also reduce the computational burden applied to the processor 150.

The robot 100 may control the camera 130 to capture the identified gas generating area 200, and identify the location of the contaminant source 300 based on an image obtained through the camera 130.

Specifically, according to an embodiment of the disclosure, the camera 130 may include the depth camera and the RGB camera, and the processor 150 according to an example may obtain the probability distribution of the presence of the contaminant source 300 corresponding to the identified gas generating area 200 based on the images obtained by the depth camera and the RGB camera, respectively.

The processor 150 may identify that the contaminant source is present at the location at which the probability on the presence of the contaminant source 300 is greater than or equal to the threshold value from among the gas generating area 200 based on the obtained probability distribution. The processor 150 may obtain information on whether the contaminant source 300 is included in the obtained image by inputting the image obtained by the camera 130 to a neural network model. In this case, the neural network model may be a model trained to identify a feature corresponding to the contaminant source from a plurality of input images.

According to an embodiment of the disclosure, the processor 150 may re-identify the gas generating area when it is identified that the contaminant source 300 is not present in the gas generating area 200 based on the obtained probability distribution.

Figure 5:
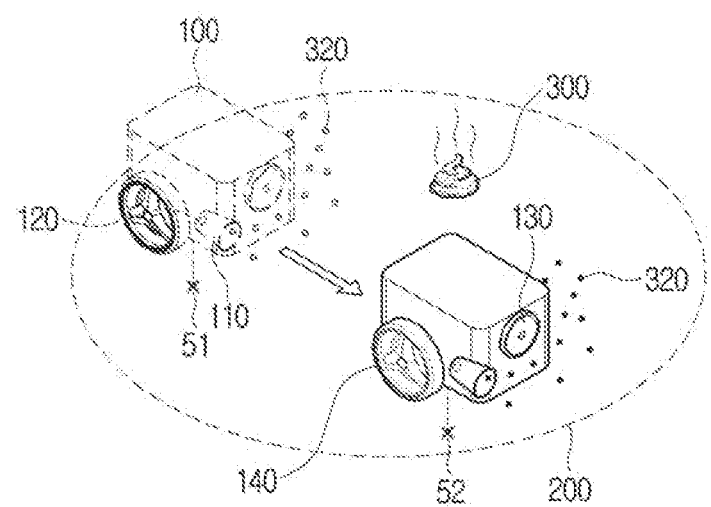
FIG. 5 is a diagram illustrating an operation of identifying a gas generating area by a robot according to an embodiment of the disclosure.

FIG. 5 is a diagram illustrating in detail an operation of identifying a gas generating area by the robot according to an embodiment of the disclosure.

In order to identify the gas generating area 200 based on the concentration of the second type gas 320, data on gas concentrations measured from at least two locations is necessary. The processor 150 may identify the gas generating area 200 while tracking concentration changes in the second type gas 320 based on data on the gas concentrations measured from a plurality of different locations.

According to an embodiment of the disclosure, the robot 100 may include a memory stored with map data of a space in which the robot 100 drives. The processor 150 may control the driver 140 for the robot 100 to move to a second location 52 on the map data when the second type gas 320 is detected from a first location 51 on the map data while the robot 100 is moving at a decreased speed.

Additionally, the processor 150 may identify the gas generating area 200 based on the first sensing data obtained by the second sensor sensing the second type gas 320 from the first location 51 and the second sensing data obtained by the second sensor from the second location 52.

Specifically, the processor 150 may update the map data stored in the memory based on the concentration of the second type gas 320 measured within the space through a simultaneous localization and mapping (SLAM), that is, a simultaneous location estimation and a map building method. The processor 150 may control the driver 140 for the robot 100 to move along a zigzag-formed route from the first location 51 to the second location 52 for the robot to sufficiently obtain sensing data according to a change in location without approaching the contaminant source 300. In this case the robot 100 may drive along the zigzag-formed route moving in and out of an area at which the concentration of the second type gas 320 is greater than or equal to the threshold value and an area at which the concentration of the second type gas 320 is less than or equal to the threshold value.

According to an embodiment of the disclosure, the processor 150 may identify an area (a closed curved surface) at which a second gas concentration is greater than or equal to the threshold value based on the map data updated through SLAM, and identify the identified area as the gas generating area 200.

Figure 6A:
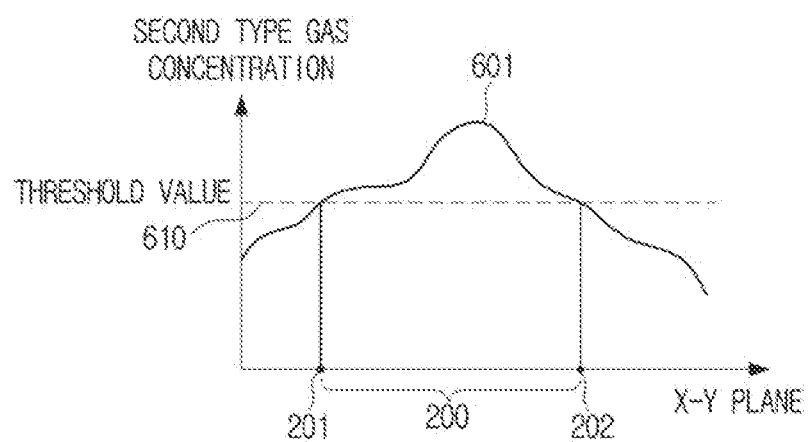
FIG. 6A and FIG. 6B are diagrams illustrating an operation of identifying a gas generating area based on a gas concentration by a robot according to an embodiment of the disclosure.
Figure 6B:
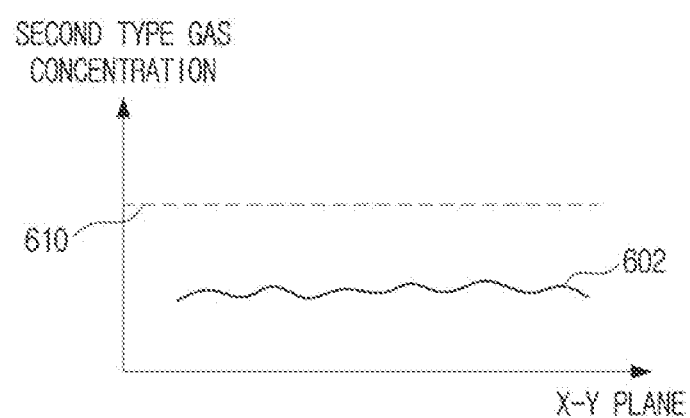

FIG. 6A and FIG. 6B are diagrams illustrating an operation of identifying a gas generating area based on a gas concentration by the robot according to an embodiment of the disclosure.

The robot 100 may estimate the concentration of the second type gas within a space based on data sensing the concentration of the second type gas 320 from a plurality of different locations. FIG. 6A and FIG. 6B show a cross-section having an orthogonal projection in a straight-line form on an X-Y plane in a space of a certain range.

The concentrations 601 and 602 of the second type gas shown in FIG. 6A and FIG. 6B may be obtained based on data on the concentration of the second type gas 320 measured while the robot 100 is driving or data estimating the concentration of the second type gas 320 in the SLAM method based on the measured data. In other words, points on the X-Y plane on which the concentrations 601 and 602 of the second type gas are shown may be an area that the robot 100 has driven, but the points may also be an area on the map data updated by the processor 150 based on the concentration of the second type gas 320 despite not been driven by the robot 100.

Referring to FIG. 6A, the space within the certain range may be a space at which the concentration 601 of the second type gas is greater than or equal to a threshold value 610 in the certain area 200.

According to an embodiment of the disclosure, the processor 150 may identify both points 201 and 202 at which the concentration 601 of the second type gas has the threshold value 610, and identify the area 200 that has both identified points 201 and 202 as a boundary as the gas generating area.

Referring to FIG. 6B, the space within the certain range may be a space at which the concentration 602 of the second type gas is less than the threshold value 610 in all areas.

In this case, according to an embodiment of the disclosure, the processor 150 may control the driver 140 for the robot 100 to move to a third location that is not included in the driven route to obtain the concentration 602 of the second type gas. Additionally, the processor 150 may identify the gas generating area based on the third sensing data obtained by the second sensor that senses the second type gas 320 from the third location. In this case, the processor 150 may identify a virtual closed curved surface applied with a boundary value calculation method for the distribution of the second type gas 320 as the gas generating area based on the first to third sensing data.

Figure 7:
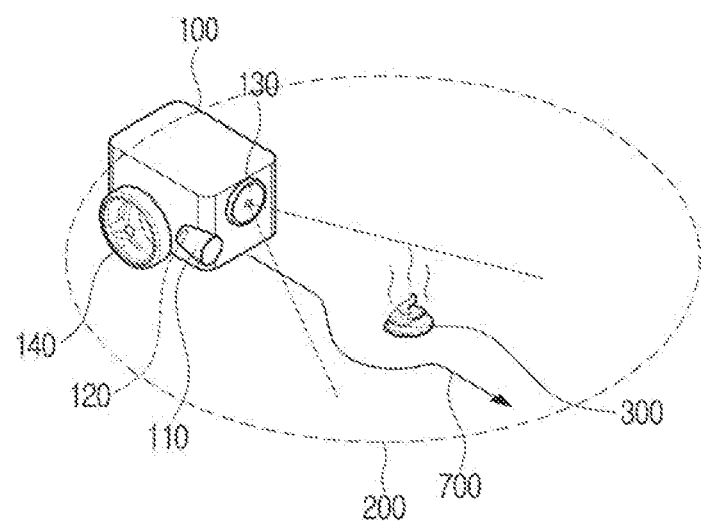
FIG. 7 is a diagram illustrating an avoidance driving of a contaminant source by a robot according to an embodiment of the disclosure.

FIG. 7 is a diagram illustrating an avoidance driving of a contaminant source by the robot according to an embodiment of the disclosure.

According to an embodiment, the processor 150 may control, based on the contaminant source 300 being identified, the driver 140 for the robot 100 to avoid the identified contaminant source 300. Specifically, the processor 150 may update an existing driving route to a driving route that does not include a location on the map data at which the identified contaminant source 300 is present.

According to an embodiment, when the robot 100 is a cleaning robot, the robot 100 may clean dust and the like distributed in an indoor space through the suctioning part. Because the contaminant source 300 such as an animal waste has a relatively heavier weight compared to dust, and includes a large amount of moisture, the robot 100 may not able to clean the contaminant source 300 through a typical dust cleaning mechanism. Accordingly, the processor 150 may control the driver 140 for the robot 100 to perform avoidance driving 700 of the contaminant source 300, and then perform an additional operation necessary in removing the contaminant source 300.

Here, the additional operation may be a particular cleaning operation corresponding to the contaminant source 300 or a notification operation of providing information on the contaminant source 300 or requesting cleaning, or the like to the user.

Figure 8A:
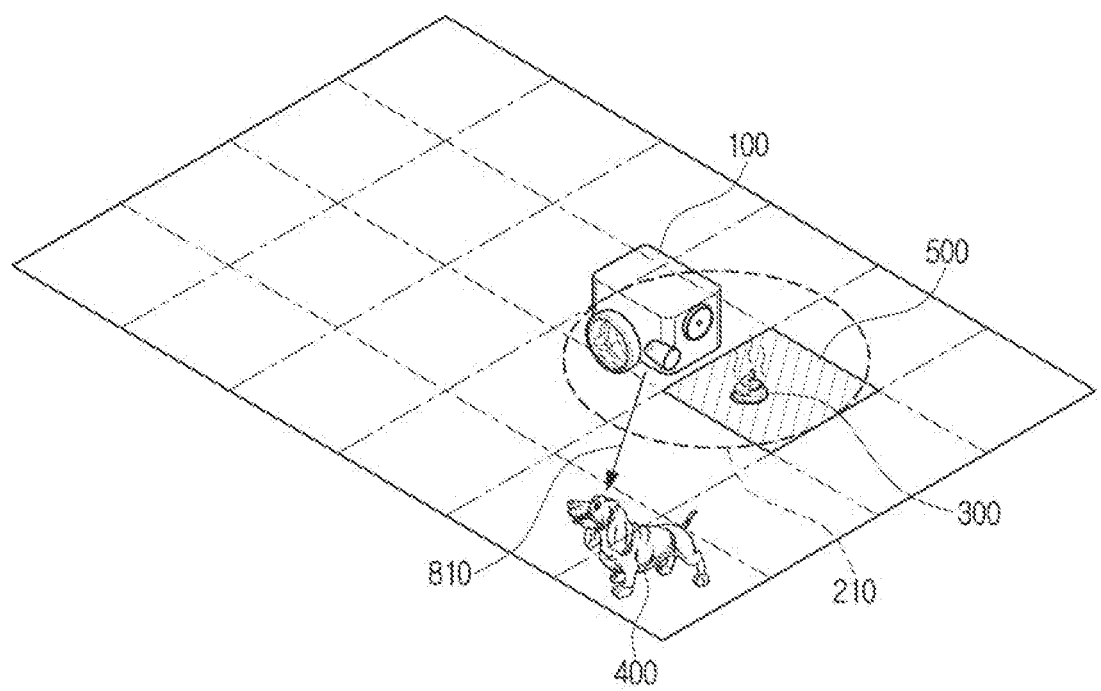
FIG. 8A and FIG. 8B are diagrams illustrating different operations according to a location of a contaminant source by a robot according to an embodiment of the disclosure.
Figure 8B:
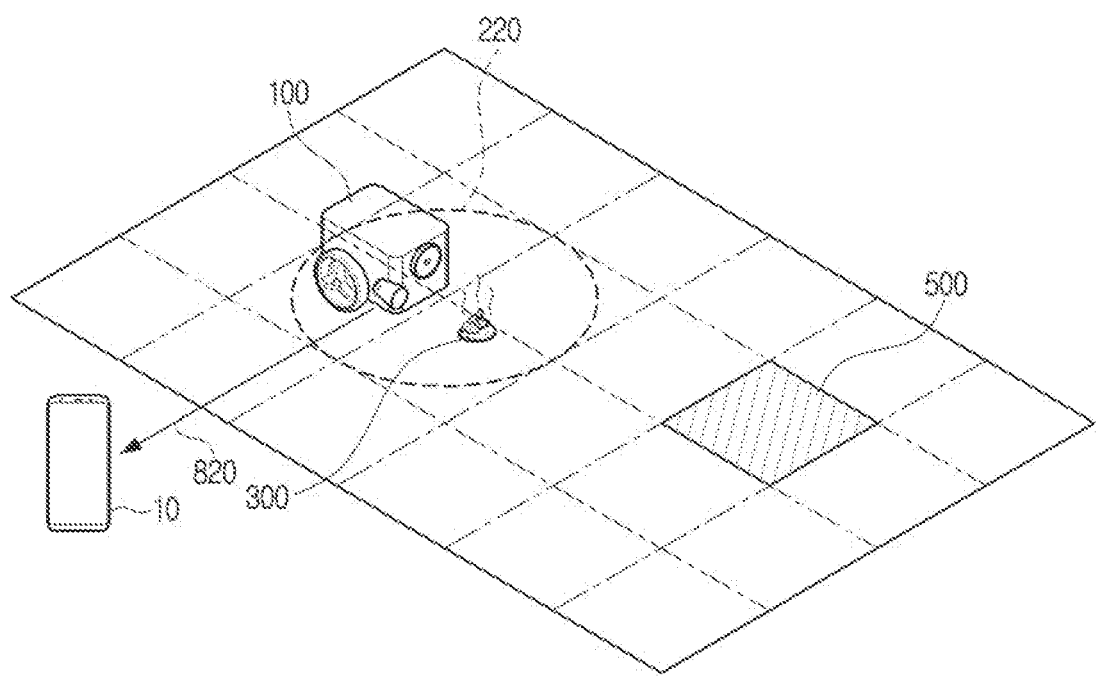

FIG. 8A and FIG. 8B are diagrams illustrating different operations according to a location of a contaminant source by the robot according to an embodiment of the disclosure.

FIG. 8A and FIG. 8B show a location relationship of the robot 100, the contaminant source 300, and an absorbent pad 500 located on an X-Y plane in an indoor space.

According to an embodiment of the disclosure, the processor 150 may provide feedback associated with an object 500 when an animal waste 300, which is the contaminant source, is identified and a pre-set object 500 on the map data is included within a gas generating area 210 identified as an area at which the pre-set object 500 is located on the map data. The pre-set object 500 may be an animal absorbent pad.

Specifically, if an absorbent pad 500 is included in the gas generating area 210 that includes the animal waste 300 which is the contaminant source, the processor may determine that the animal 400 defecated on the absorbent pad 500, and provide feedback 810 to the animal 400. Here, the feedback 810 may be a reward for the animal 400 having defecated on the absorbent pad 500.

Referring to FIG. 8B, according to an embodiment of the disclosure, the robot 100 may further include the communication interface, and the processor 150 may provide information 820 associated with the gas generating area to an external device 10 through the communication interface when the animal waste 300 which is the contaminant source is identified, and the area at which pre-set object 500 is located on the map data is not included within an identified gas generating area 220.

Here, the external device 10 may refer to a device that may be implemented to receive information from the robot 100 to the user. The external device 10 may be implemented as a smartphone, but is not limited thereto, and may be implemented as the device that can perform communication with the robot, and in various devices such as, for example, and without limitation, a tablet personal computer (PC), a mobile phone, a video phone, a laptop PC, a netbook computer, a work station, a personal digital assistant (PDA), a portable multimedia player (PMP), an MP3 player, a camera, a virtual reality (VR) implementing device, wearable devices, or the like.

Specifically, if the absorbent pad 500 is not included in the gas generating area 220 that includes the animal waste 300 which is the contaminant source, the processor 150 may determine as the animal 400 having defecated at an area other than the absorbent pad 500, and provide information 820 associated with the gas generating area to the external device 10 through the communication interface. Here, the information 820 associated with the gas generating area may be information corresponding to a notification of providing information on the waste 300 located in the area other than the absorbent pad 500, requesting cleaning, or the like.

According to an embodiment of the disclosure, the robot 100 may provide information on the waste 300 through a companion application and information corresponding to a notification of requesting cleaning. Here, the information on the waste 300 may include information on coordinates at which the waste is located on the map data and information on an abnormal symptom of the animal 400 that is presumed from a characteristic of the waste. As in FIG. 8A, even if the animal 400 has defecated on the absorbent pad 500, the robot 100 may provide information notifying a changing of the absorbent pad to the external device 10.

The user who received, from the robot 100, the information 820 associated with the gas generating area through the external device 10 may perform ventilation by opening a window located close to the gas generating area 220 or clean the waste 300.

Figure 9:
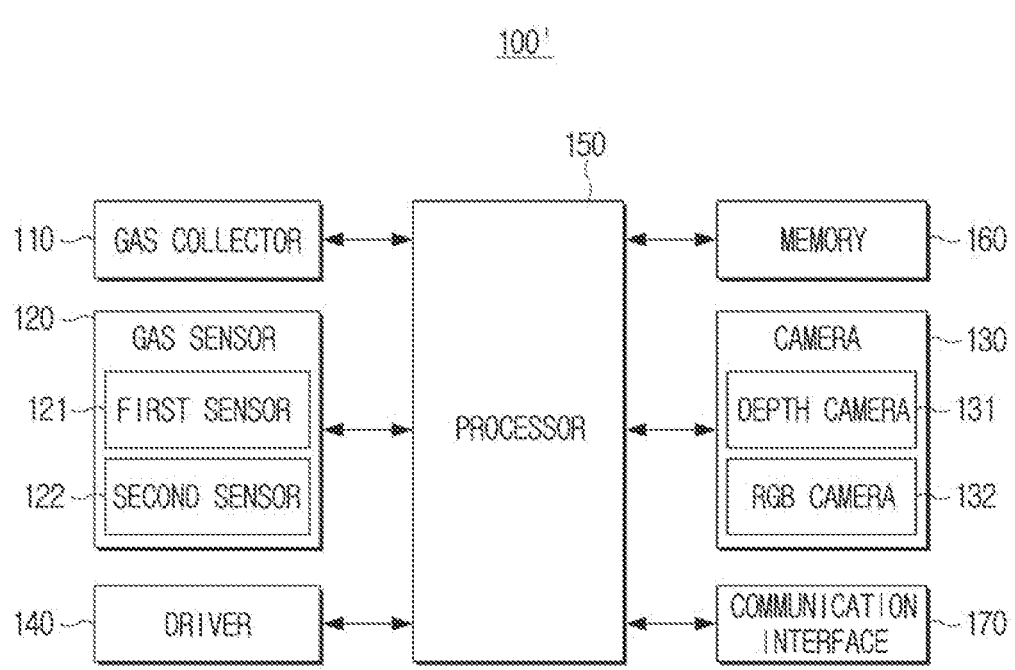
FIG. 9 is a block diagram illustrating in detail a functional configuration of a robot according to an embodiment of the disclosure.

FIG. 9 is a block diagram illustrating a functional configuration of the robot according to an embodiment of the disclosure.

Referring to FIG. 9, a robot 100' may include the gas collector 110, the gas sensor 120 including a first sensor 121 and a second sensor 122, the camera 130 including a depth camera 131 and a RGB camera 132, the driver 140, the processor 150, the memory 160, and a communication interface 170. Detailed descriptions of configurations that overlap with the configurations shown in FIG. 2 from among the configurations shown in FIG. 9 will be omitted.

The memory 160 may store data necessary for the various embodiments of the disclosure. The memory 160 may be implemented in an embedded memory form in the robot 100', or implemented in an attachable and detachable memory form in the robot 100' according to a data storage use. For example, the data for driving the robot 100' may be stored in the memory embedded in the robot 100', and data for an expansion function of the robot 100' may be stored in the memory attachable to and detachable from the robot 100'. The memory embedded in the robot 100' may be implemented as at least one from among a volatile memory (e.g., a dynamic RAM (DRAM), a static RAM (SRAM), or a synchronous dynamic RAM (SDRAM)), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). Additionally, the memory that is attachable to and detachable from the robot 100' may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., USB memory) connectable to a USB port, or the like.

According to an embodiment of the disclosure, the memory 160 may be stored with map data of a space in which the robot 100' drives.

The communication interface 170 may input and output data of various types. For example, the communication interface 170 may transmit and receive data of various types with an external device (e.g. source device), an external storage medium (e.g., USB memory), and an external server (e.g., WEBHARD) through a communication method such as, for example, and without limitation, an AP-based Wi-Fi (Wi-Fi, wireless LAN network), Bluetooth, ZigBee, a wired/wireless local area network (LAN), wide area a network (WAN), Ethernet, IEEE 1394, a high-definition multimedia interface (HDMI), a universal serial bus (USB), a mobile high-definition link (MHL), Audio Engineering Society/European Broadcasting Union (AES/EBU), an Optical, a Coaxial, and the like.

Figure 10:
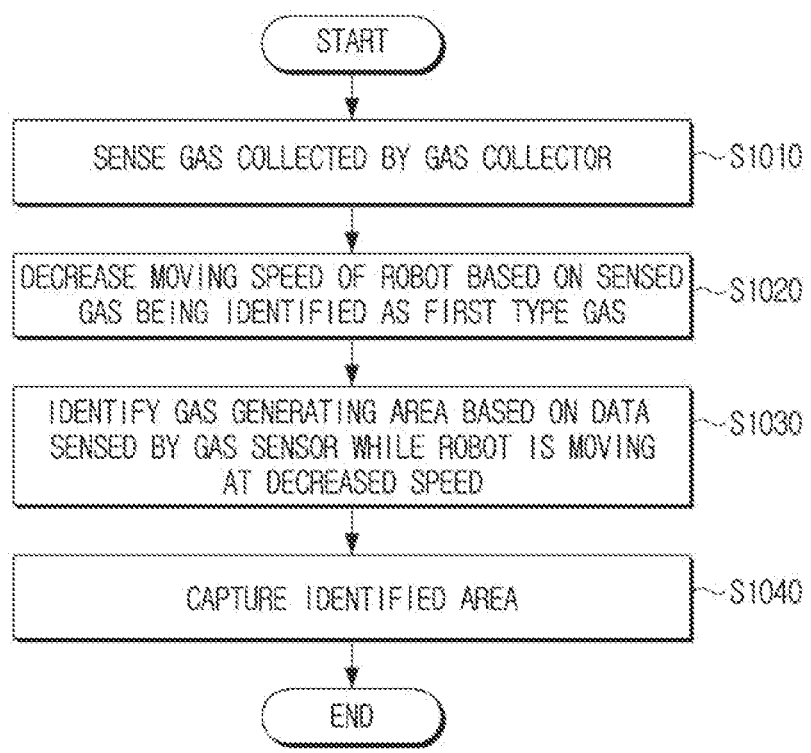
FIG. 10 is a flowchart illustrating a controlling method according to an embodiment of the disclosure.

FIG. 10 is a flowchart illustrating a controlling method according to an embodiment of the disclosure.

In operation S1010, a controlling method of the robot may include the gas sensor that may sense gas collected by the gas collector. Then, in operation S1020, the moving speed of the robot is decreased based on the sensed gas being identified as the first type gas. Then, in operation S1030, the gas generating area is identified based on data sensed by the gas sensor while the robot is moving at a decreased speed. Lastly, in operation S1040, the identified area is captured.

In operation S1020, the gas sensor may include the first sensor that senses the first type gas and the second sensor that senses the second type gas that is different from the first type gas, and the decreasing the moving speed of the robot may include decreasing the moving speed of the robot based on the first type gas being sensed by the first sensor, and in operation, S1030, the identifying the gas generating area may include identifying the gas generating area based on data sensed by the second sensor while the robot is moving at a decreased speed.

The first type gas may be faster in propagation velocity than the second type gas.

Additionally, moving the robot to the second location on the map data based on the second gas being detected from the first location on the map data of the space in which the robot drives while the robot is moving at a decreased speed may be further included, and in operation S1030, the identifying the gas generating area may include identifying the gas generating area based on the first sensing data obtained by the second sensor from the first location and the second sensing data obtained by the second sensor from the second location.

The identifying the gas generating area, in operation S1030 may include identifying the area at which the concentration of the second type gas based on the first sensing data and the second sensing data is greater than or equal to the threshold value, and identifying the identified area as the gas generating area.

The moving the robot to the third location on the map data is based on the concentration of the second type gas obtained, that is based on the first sensing data and the second sensing data being less than the threshold value, may be further included, and in operation S1030, the identifying the gas generating area may include identifying the gas generating area based on the first sensing data, the second sensing data, and the third sensing data obtained by the second sensor from the third location.

Based on the gas generating area being identified, the obtaining the probability distribution of the presence of the contaminant source corresponding to the identified gas generating area based on images obtained by the depth camera and the RGB camera, respectively, and identifying that the contaminant source 300 is present at the location at which the probability on the presence of the contaminant source is greater than or equal to the threshold value from among the gas generating area based on the obtained probability distribution may be further included.

The providing feedback associated with the object based on the contaminant source being identified and the area at which the pre-set object is located on the map data being included within the identified gas generating area and providing information associated with the gas generating area to the external device based on the contaminant source being identified, and the area at which the pre-set object is located on the map data not being included within the identified gas generating area may be further included. The information associated with the gas generating area may include information on the contaminant source.

Additionally, re-identifying the gas generating area based on the contaminant source being identified as not present in the gas generating area based on the obtained probability distribution may be further included.

The methods according to the various embodiments of the disclosure described above may be implemented in an application form installable to a robot of the related art.

The methods according to the various embodiments of the disclosure described above may be implemented with only a software upgrade or a hardware upgrade of the robot of the related art.

The various embodiments of the disclosure described above may be performed through an embedded server provided in the robot or through at least one external server.

The various embodiments described above may be implemented in a recordable medium which is readable by computer or a device similar to computer using software, hardware, or the combination of software and hardware. In some cases, the embodiments described herein may be implemented by the processor 150 on its own. According to a software implementation, embodiments such as the procedures and functions described herein may be implemented with separate software modules. Respective software modules may perform one or more of the functions and operations described herein Computer instructions for performing processing operations in the robot 100 according to the various embodiments described above may be stored in a non-transitory computer-readable medium. The computer instructions stored in this non-transitory computer-readable medium may cause a specific device to perform a processing operation of the robot 100 according to the above-described various embodiments when executed by a processor of the specific device.

The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

While embodiments of the disclosure have been illustrated and described, it will be understood that the various embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A robot comprising:
   a gas collector;
   a gas sensor configured to sense a gas collected by the gas collector, the gas sensor comprising a first sensor configured to sense a first type gas and a second sensor configured to sense a second type gas being different from the first type gas;
   a camera;
   a memory configured to store map data of a space in which the robot is configured to drive;
   a driver; and
   a processor configured to:
      based on the first type gas being sensed by the first sensor, control the driver to decrease a moving speed of the robot,
      identify a gas generating area based on data sensed by the second sensor while the robot is moving at a decreased moving speed, and
      control the camera to capture the identified gas generating area,
   wherein the processor is further configured to:
      identify the gas generating area based on first sensing data obtained by the second sensor from a first location on the map data and second sensing data obtained by the second sensor from a second location on the map data, and
   wherein the second location is different from the first location.

2. The robot of claim 1, wherein the first type gas is faster in propagation velocity than the second type gas.

3. The robot of claim 1, wherein the processor is further configured to:
   based on the second type gas being detected from the first location while the robot is moving at the decreased moving speed, control the driver to move the robot to the second location.

4. The robot of claim 3, wherein the processor is further configured to:
   identify an area at which a concentration of the second type gas based on the first sensing data and the second sensing data is greater than or equal to a threshold value, and
   identify the identified area as the gas generating area.

5. The robot of claim 4, wherein the processor is further configured to:
   based on the concentration of the second type gas obtained based on the first sensing data and the second sensing data being less than the threshold value, control the driver to move the robot to a third location on the map data, and
   identify the gas generating area based on the first sensing data, the second sensing data, and third sensing data obtained by the second sensor from the third location.

6. The robot of claim 3, wherein the camera comprises a depth camera and an RGB camera, and
   the processor is further configured to:
      based on the gas generating area being identified, obtain a probability distribution of a presence of a contaminant source corresponding to the identified gas generating area based on images obtained by the depth camera and the RGB camera, respectively, and
      identify that the contaminant source is present at a location at which a probability on the presence of the contaminant source is greater than or equal to a threshold value from among the gas generating area based on the obtained probability distribution of the presence of the contaminant source.

7. The robot of claim 6, further comprising a communication interface,
   wherein the processor is further configured to:
      based on the contaminant source being identified and an area at which a preset object is located on the map data being comprised within the identified gas generating area, provide feedback associated with the preset object, and
      based on the contaminant source being identified and the area at which the preset object is located on the map data not being comprised within the identified gas generating area, provide information associated with the gas generating area to an external device through the communication interface, and wherein the information comprises information on the contaminant source.

8. The robot of claim 6, wherein the processor is further configured to re-identify the gas generating area based on it being identified that the contaminant source is not present in the gas generating area based on the obtained probability distribution.

9. The robot of claim 6, wherein the processor is further configured to control the driver to cause the robot to avoid the identified contaminant source.

10. The robot of claim 1, wherein the gas collector comprises a gas collecting funnel that comprises a front surface part and a back surface part, wherein the front surface part of the gas collecting funnel has an open circular shape or an open elliptical shape, and wherein the back surface part of the gas collecting funnel has the open circular shape or the open elliptical shape that is smaller than the front surface part of the gas collecting funnel.

11. A method for controlling of a robot comprising a gas sensor, comprising a first sensor configured to sense a first type gas and a second sensor configured to sense a second type gas being different from the first type gas, the method comprising:

sensing, by the first sensor, the first type gas collected by a gas collector;

based on the first type gas being sensed by the first sensor, decreasing a moving speed of the robot;

identifying a gas generating area based on data sensed by the second sensor while the robot is moving at the decreased moving speed; and capturing the identified gas generating area using a camera of the robot, wherein the identifying the gas generating area comprises identifying the gas generating area based on first sensing data obtained by the second sensor from a first location on a map data of a space in which the robot is configured to drive and second sensing data obtained by the second sensor from a second location on the map data, and wherein the second location is different from the first location.

12. The method of claim 11, wherein the first type gas is faster in propagation velocity than the second type gas sensed by the second sensor.

13. The method of claim 12, further comprising, based on the second type gas being detected from the first location while the robot is moving at the decreased moving speed, moving the robot to the second location.

* * * * *